United States Patent
Marr et al.

(10) Patent No.: US 7,376,665 B2
(45) Date of Patent: May 20, 2008

(54) SYSTEMS, METHODS AND COMPUTER PROGRAM PRODUCTS FOR AUTOMATING RETRIEVAL OF DATA FROM A DB2 DATABASE

(75) Inventors: Gary William Marr, Marietta, GA (US); Jane Barbara Nowak, Marietta, GA (US); Piotr Horbulewicz, Lawrenceville, GA (US); Leonid Anatolyevich Volozhanin, Lilburn, GA (US)

(73) Assignee: AT&T Delaware Intellectual Property, Inc., Wilmington, DE (US)

( * ) Notice: Subject to any disclaimer, the term of this patent is extended or adjusted under 35 U.S.C. 154(b) by 569 days.

(21) Appl. No.: 10/702,914

(22) Filed: Nov. 6, 2003

(65) Prior Publication Data

US 2005/0102310 A1    May 12, 2005

(51) Int. Cl.
   *G06F 17/00*    (2006.01)
(52) U.S. Cl. .................... 707/102; 707/1; 707/104.1; 707/200; 709/227; 709/230
(58) Field of Classification Search .......... 707/1–10, 707/100–104.1, 200–206; 709/213–219, 709/232, 227, 230; 717/101, 127, 164
See application file for complete search history.

(56) References Cited

U.S. PATENT DOCUMENTS

| | | | |
|---|---|---|---|
| 4,698,757 A * | 10/1987 | Dill et al. ................ | 726/8 |
| 5,222,235 A | 6/1993 | Hintz et al. | |
| 5,517,641 A | 5/1996 | Barry et al. | |
| 5,546,577 A | 8/1996 | Marlin et al. | |
| 5,579,515 A | 11/1996 | Hintz et al. | |
| 5,758,357 A | 5/1998 | Barry et al. | |
| 5,819,263 A * | 10/1998 | Bromley et al. .............. | 707/3 |
| 5,887,274 A | 3/1999 | Barry et al. | |
| 5,920,846 A | 7/1999 | Storch et al. | |
| 6,009,271 A * | 12/1999 | Whatley .................. | 717/127 |
| 6,016,394 A | 1/2000 | Walker | |
| 6,078,920 A | 6/2000 | Tan et al. | |
| 6,115,704 A | 9/2000 | Olson et al. | |
| 6,163,783 A | 12/2000 | Hintz et al. | |
| 6,643,690 B2 * | 11/2003 | Duursma et al. .......... | 709/217 |
| 6,735,765 B1 * | 5/2004 | Schumacher .............. | 717/164 |
| 6,963,905 B1 * | 11/2005 | Melman .................. | 709/213 |
| 2003/0115551 A1 | 6/2003 | Deleeuw | |

OTHER PUBLICATIONS

Hamid Pirahesh et al., A Rule Engine for Query Transformation in Starburst and IBM DB2 C/S DBMS, IEEE, 1997, 391-400.*
Josephine Cheng et al., An Efficient Hybrid Join Algorithm: A DB2 Prototype, IEEE, 1991, 171-180.*

(Continued)

*Primary Examiner*—Jean B Fleurantin
(74) *Attorney, Agent, or Firm*—Myers Bigel Sibley & Sajovec, P.A.

(57) ABSTRACT

Data is automatically retrieved from a DataBase 2 (DB2) database using a DB2 scripter module that is configured to automatically log on to the DB2 database, to automatically perform a query of the DB2 database, and to automatically extract from the DB2 database a dataset that results from the query. A dataset processor module is configured to convert the dataset into a text file, and to deliver the text file to a delivery site, for retrieval by the user. The DB2 scripter module can extract the dataset by printing the dataset to a DB2 virtual printer and/or by exporting the dataset to a File Transfer Protocol (FTP) site.

17 Claims, 11 Drawing Sheets

OTHER PUBLICATIONS

Donald D. Chamberlin, Evolution of Object-Relational Database Technology in DB2, IEEE, 1997, 131-135.*

*TaskMate Reference Manual, Version 7.0*, Wotech Software Systems, 1996-1997.

* cited by examiner

| LAC-RC | ST | LEADWC | ORDERNUMBER | SVCTYP | LAM-DATE | CURR-DUE | CURR-RFS-TS | CURRANSWER | ENGR-RC |
|---|---|---|---|---|---|---|---|---|---|
| Nxxxxxxx | PF | 901682 | C94YTxxx | ADL | | 20030812 | 20030804-2161410 | 28T00539N | Nxxxxxxx |
| Nxxxxxxx | PF | 615226 | C94YTxxx | ADL | | 20030805 | 20030804-2161431 | LACREVIEW | Nxxxxxxx |
| Nxxxxxxx | PF | 931358 | C94YTxxx | ADL | | 20030805 | 20030804-2161445 | LACREVIEW | Nxxxxxxx |
| Nxxxxxxx | PF | 931358 | T94YTxxx | ADL | | 20030805 | 20030804-2161443 | LACREVIEW | Nxxxxxxx |
| Nxxxxxxx | PF | 865522 | C94YTxxx | ADL | | 20030804 | 20030804-2161438 | LACREVIEW | Nxxxxxxx |
| Nxxxxxxx | PF | 615790 | C94YTxxx | ADL | | 20030805 | 20030804-2161454 | 38C15174N | Nxxxxxxx |
| Nxxxxxxx | PF | 615242 | N94YTxxx | ADL | | 20030805 | 20030801-2131536 | SOC | Nxxxxxxx |
| Nxxxxxxx | PF | 901372 | C94YTxxx | ADL | | 20030806 | 20030804-2160916 | SOC | Nxxxxxxx |
| Nxxxxxxx | PF | 423496 | C94YTxxx | POTS | | 20030807 | 20030804-2161436 | LACREVIEW | Nxxxxxxx |
| Nxxxxxxx | PF | 901346 | C94YTxxx | POTS | | 20030808 | 20030804-2161045 | SOC | Nxxxxxxx |
| Nxxxxxxx | PF | 423472 | T94YTxxx | POTS | | 20030813 | 20030804-2161454 | LACREVIEW | Nxxxxxxx |
| Nxxxxxxx | PF | 931729 | C94YTxxx | POTS | | 20030818 | 20030804-2161050 | SOC | Nxxxxxxx |
| Nxxxxxxx | PF | 615331 | C94YTxxx | POTS | | 20030825 | 20030804-2161145 | LACREVIEW | Nxxxxxxx |
| Nxxxxxxx | PF | 615859 | N94YTxxx | POTS | 20030702 | 20030711 | 20030701-1821215 | SOC | Nxxxxxxx |
| Nxxxxxxx | PF | 901754 | C94YTxxx | SS | 20030731 | 20030806 | 20030804-2161402 | 38T01118N | Nxxxxxxx |
| Nxxxxxxx | PF | 931934 | C94YTxxx | SS | 20030728 | 20030808 | 20030804-2161403 | 38Y00717N | Nxxxxxxx |
| Nxxxxxxx | PF | 901346 | N94YTxxx | SS | 20030718 | 20030915 | 20030804-2161128 | 38T01074N | Nxxxxxxx |
| Nxxxxxxx | PF | 901682 | C94YTxxx | SS | 20030722 | 20030728 | 20030731-2120903 | SOC | Nxxxxxxx |

SYSTEMS, METHODS AND COMPUTER PROGRAM PRODUCTS FOR AUTOMATING RETRIEVAL OF DATA FROM A DB2 DATABASE

FIELD OF THE INVENTION

This invention relates to data processing systems, methods and/or computer program products, and more specifically to DataBase 2 (DB2) database systems, methods and/or computer program products.

BACKGROUND OF THE INVENTION

Databases are widely used on computers to store and retrieve information. Enterprise database environments may be provided on enterprise data processing systems, to store and retrieve data using large enterprise databases, for use in transactional and/or real-time systems. One widely used legacy, enterprise database environment is International Business Machines Corporation's (IBM) DataBase 2 (DB2) database environment.

Although DB2 databases are widely used with enterprise data, it may be difficult for a typical user, who is not familiar with the DB2 database environment, to extract data needed by the user from the DB2 environment.

SUMMARY OF THE INVENTION

Some embodiments of the present invention provide systems for automating retrieval of data from a DB2 database. A DB2 scripter module is configured to automatically log on to the DB2 database, to automatically perform a query of the DB2 database and to automatically extract from the DB2 database a dataset that results from the query. A dataset processor module is configured to convert the dataset that is extracted from the DB2 database into a text file and to deliver the text file to a delivery site for retrieval by the user. In other embodiments, a user processor module is configured to convert the text file into a format that is viewable by the user. The DB2 scripter may be activated upon occurrence of a predetermined event, such as a predetermined time and/or upon activation by a user, to automatically retrieve data from the DB2 database.

In some embodiments, the DB2 scripter module automatically extracts the dataset that results from the query, by printing the dataset to a DB2 virtual printer. In other embodiments, the DB2 scripter module exports the dataset to a File Transfer Protocol (FTP) site. In some embodiments, the dataset processor module comprises a UNIX scripter module and, in some embodiments, the user processor module comprises a personal computer spreadsheet macro.

It will be understood that, although embodiments of the present invention have been described above primarily with respect to systems for automating retrieval of data from a DB2 database, other embodiments can provide analogous methods and/or computer program products. Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

DETAILED DESCRIPTION

The present invention now will be described more fully hereinafter with reference to the accompanying figures, in which embodiments of the invention are shown. This invention may, however, be embodied in many alternate forms and should not be construed as limited to the embodiments set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like numbers refer to like elements throughout the description of the figures.

The present invention is described below with reference to block diagrams and/or flowchart illustrations of methods, apparatus (systems) and/or computer program products according to embodiments of the invention. It is understood that a block of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

As will be appreciated by one of skill in the art, the present invention may be embodied as a method, data processing system and/or computer program product. Thus, the present invention may take the form of an entirely hardware embodiment, an entirely software embodiment or an embodiment combining software and hardware aspects, which may be collectively referred to herein as a "module".

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

Figure 1:
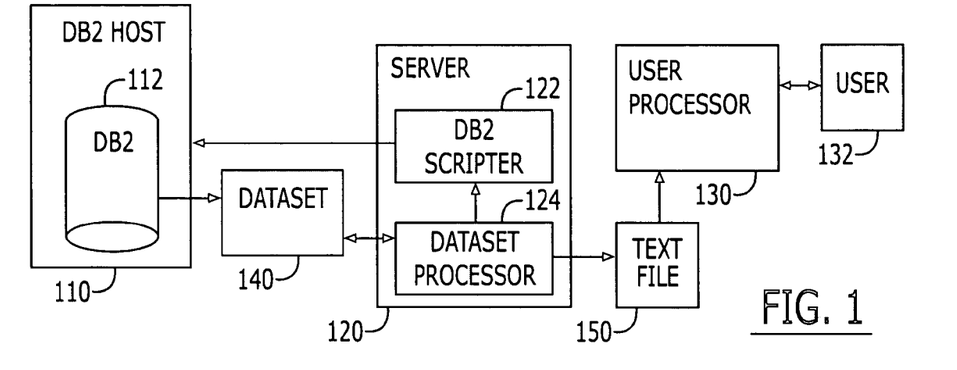
FIGS. 1-3 are block diagrams of systems, methods and/or computer program products for automating retrieval of data from a DB2 database according to various embodiments of the present invention.

FIG. 1 is a block diagram of systems, methods and/or computer program products for automating retrieval of data from a DB2 database according to some embodiments of the present invention. As shown in FIG. 1, a DB2 database 112 is contained on a DB2 host 110. DB2 host 110 may include one or more enterprise, application, personal, pervasive and/or embedded computer systems that may be interconnected by one or more networks, including the Internet. Moreover, the DB2 database 112 may be a centralized or distributed DB2 database. The design and operation of the DB2 host 110 and the DB2 database 112 are well known to those having skill in the art and need not be described further herein.

Still referring to FIG. 1, a server 120, such as a UNIX server, may be contained on one or more enterprise, application, personal, pervasive and/or embedded computing systems that may be interconnected by one or more networks, including the Internet. Moreover, the server 120 may be integrated, at least in part, with the DB2 host 110.

As shown in FIG. 1, the server 120 includes a DB2 scripter module 122 that may include general purpose hardware, dedicated hardware and/or one or more computer programs that are configured to automatically log on to the DB2 database 112, to automatically perform a query of the DB2 database 112, and to automatically extract from the DB2 database a dataset 140 that results from the query. In FIG. 1, the dataset 140 is shown as being exported outside the DB2 host 110, and residing outside the server 120. However, it will be understood that the dataset 140 may be contained at least partially in the DB2 host 110 and/or in the server 120.

Still referring to FIG. 1, a dataset processor module 124, which may include general purpose hardware, dedicated hardware and/or one or more computer programs, is configured to convert the dataset 140 that is extracted from the DB2 database 112 into a text file 150, and to deliver the text file to a user processor 130, for retrieval by at least one user 132. It will be understood by those having skill in the art that the dataset processor module 124 may be at least partially integrated with the DB2 scripter module 122, and may be included on the same and/or a different data processing system therefrom. Moreover, although the text file 150 is shown as being external to the DB2 host 110 and server 120, it may be at least partially contained therein. The user processor 130 may include one or more enterprise, application, personal, pervasive and/or embedded computing systems that may be interconnected by one or more networks, including the Internet. Finally, although the user processor 130 is shown as being separate from the server 120 and/or the DB2 host 110, it also may be at least partially included therein.

Figure 2:
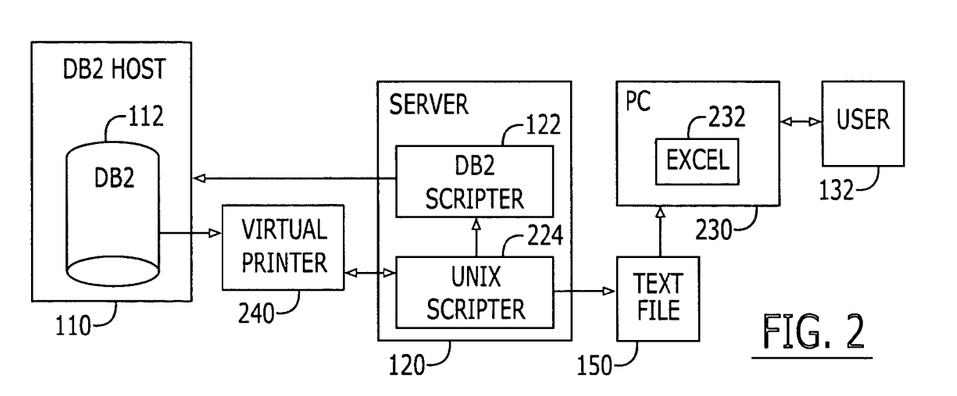

FIG. 2 is a block diagram of other embodiments of the present invention. As shown in FIG. 2, in these embodiments, the DB2 scripter module 122 is configured to automatically extract from the DB2 database 112 a dataset that results from the query by printing the dataset to a DB2 virtual printer 240. Moreover, the dataset processor mode 124 may be embodied by a UNIX scripter module 224 that may include general purpose hardware, dedicated hardware and/or one or more computer programs. As also shown in FIG. 2, the user processor 130 may be embodied as a personal computer 230 that executes a conventional database or spreadsheet product such as a Microsoft Excel spreadsheet 232.

Figure 3:
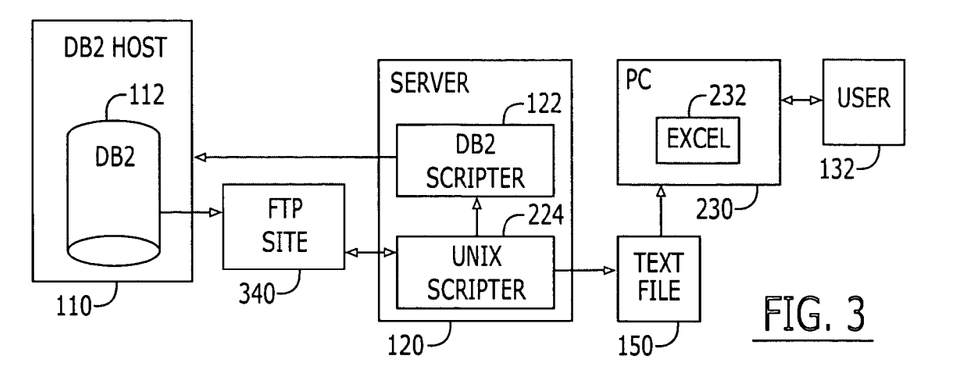

FIG. 3 is a block diagram of still other embodiments of the present invention. In these embodiments, the DB2 scripter module 122 is configured to automatically extract from the DB2 database 112 a dataset that results from the query by exporting the dataset to a File Transfer Protocol (FTP) site 340. As is well known to those having skill in the art, FTP is a protocol that is used to upload and download files on the Internet. An FTP site on the Internet can store a number of files, and runs an FTP server application that waits for transfer requests. The design of FTP sites are well known to those having skill in the art and need not be described further herein.

Figure 4:
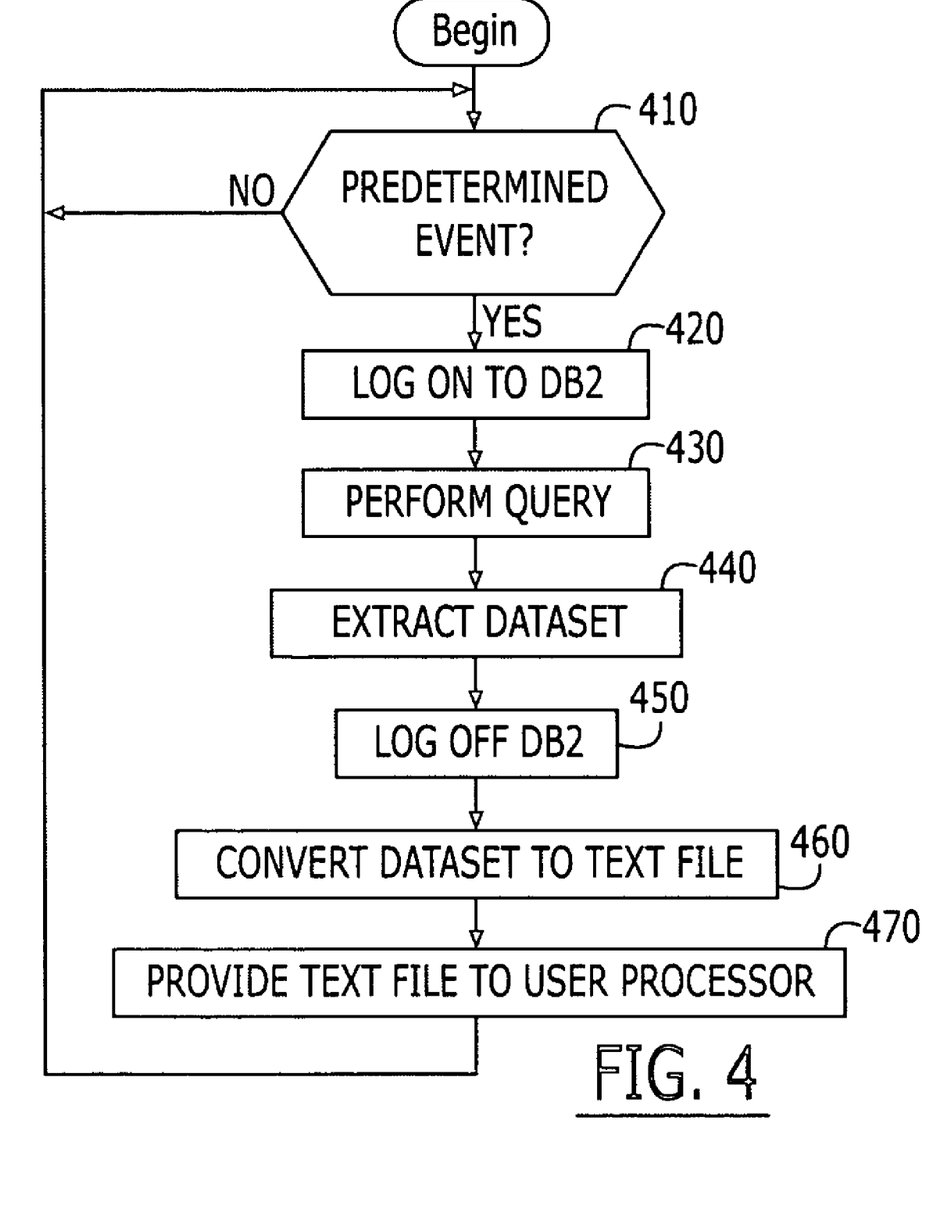
FIG. 4 is a flowchart of operations that may be performed according to various embodiments of the present invention, to automatically retrieve data from a DB2 database.

FIG. 4 is a flowchart of operations that may be performed according to various embodiments of the present invention, to automatically retrieve data from a DB2 database. These operations may be performed automatically in response to occurrence of a predetermined event at Block 410, such as occurrence of a predetermined time and/or activation by a user. As used herein, the term "automatically" means that manual intervention is not needed in order to retrieve the data from the DB2 database upon occurrence of the predetermined event. Operations of FIG. 4 may be performed by the DB2 scripter module 122 and/or the dataset processor module 124 of FIG. 1 and/or the DB2 scripter module 122 and/or the UNIX scripter module 224 of FIGS. 2 and/or 3.

More specifically, in some embodiments, the predetermined event at Block 410 is occurrence of a predetermined time, such that the operations of FIG. 4 are performed upon occurrence of a predetermined time. The result of the operations may then be available to various users, such as an end user 132 of FIGS. 1-3 when desired by an end user. In other embodiments, the predetermined event at Block 410 may be activation by an administrative user who is different from the user 132 of FIGS. 1-3. For example, a programmer, server administrator or other individual with links to the server 120 of FIGS. 1-3 can initiate the operations of FIG. 4 as an administrative user. Thus, in embodiments wherein the predetermined event is an occurrence of a predetermined time or activation by an administrative user, a single query of the database may be performed once in order to allow several end users, such as the end users 132 of FIGS. 1-3, to use the same data from the DB2 host 110. These embodiments can thereby reduce or eliminate the occurrence of several end users initiating repetitive queries for the same data from the DB2 host, as well as reducing excessive demands on the server 120 and/or DB2 host 110. In other embodiments, the predetermined event can be activation by an end user, such as an end user 132 of FIGS. 1-3. This may allow the very latest data to be obtained by the end user 132 at the potential expense of performing repetitive queries for the same data and/or placing additional demands on the server 120 and/or DB2 host.

Still referring to FIG. 4, upon occurrence of the predetermined event at Block 410, a DB2 scripter module, such as the DB2 scripter module of FIGS. 1-3, may be activated, for example under control of the dataset processor module 124 of FIG. 1 and/or UNIX scripter module 224 of FIGS. 2 or 3. The DB2 scripter module 122 is configured to automatically log on to the DB2 database at Block 420, to automatically perform a query of the DB2 database at Block 430, and to automatically extract from the DB2 database a dataset, such as dataset 140, which results from the query, at Block 440. Operations of Blocks 420, 430 and 440 will now be described in detail below.

Figure 5:
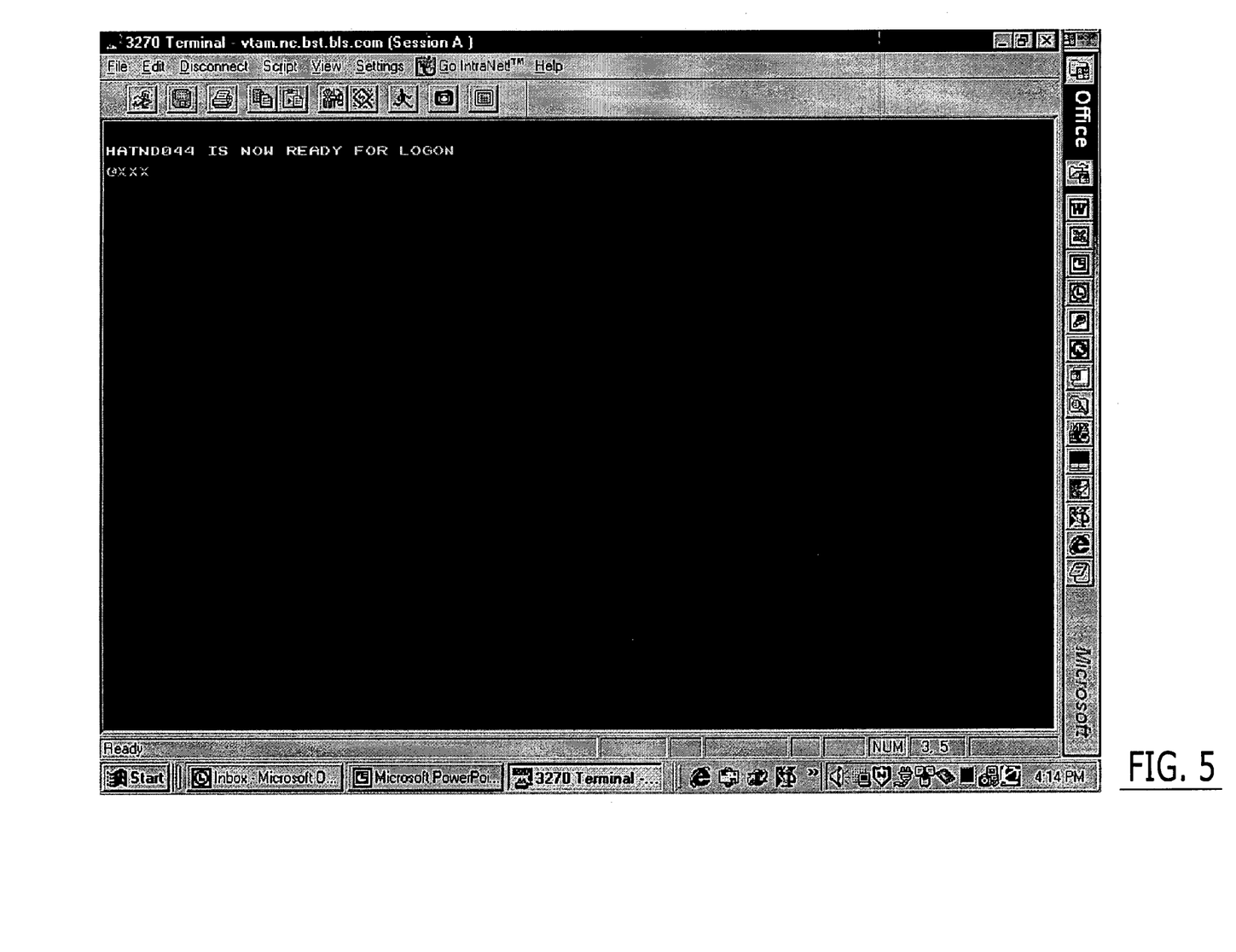
FIGS. 5-12 illustrate various user interfaces that may be activated when automatically retrieving data from a DB2 database according to various embodiments of the present invention.
Figure 6:
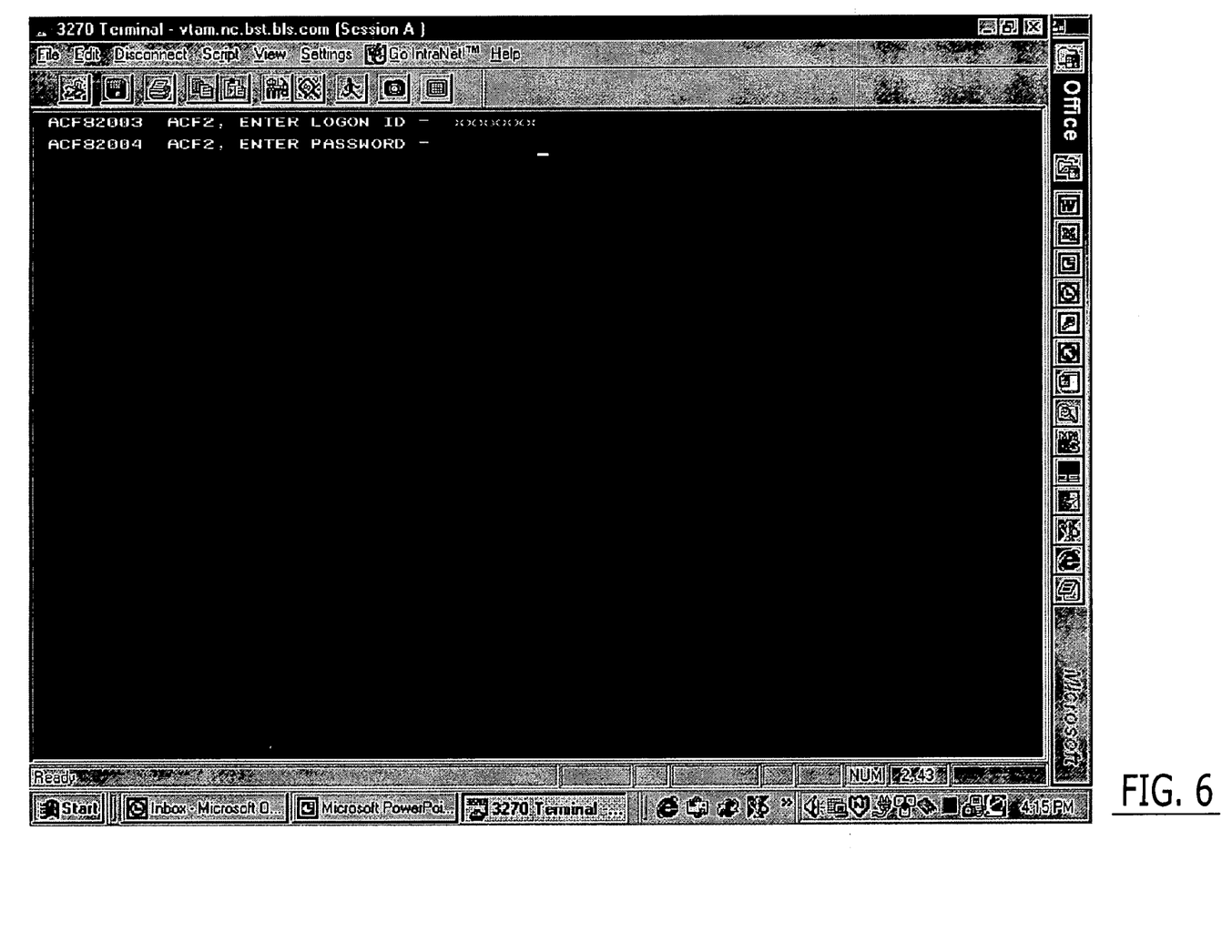
Figure 7:
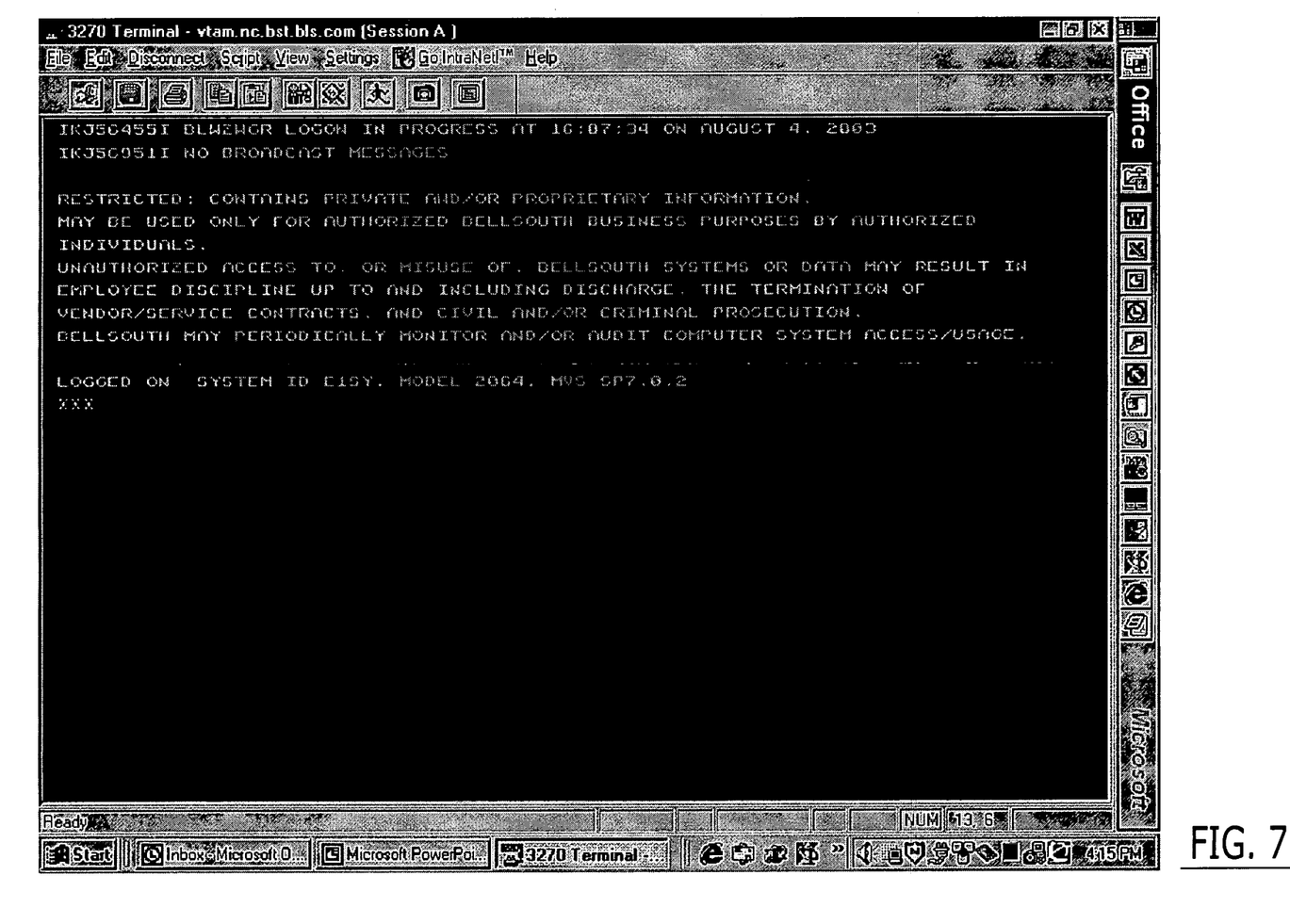
Figure 8:
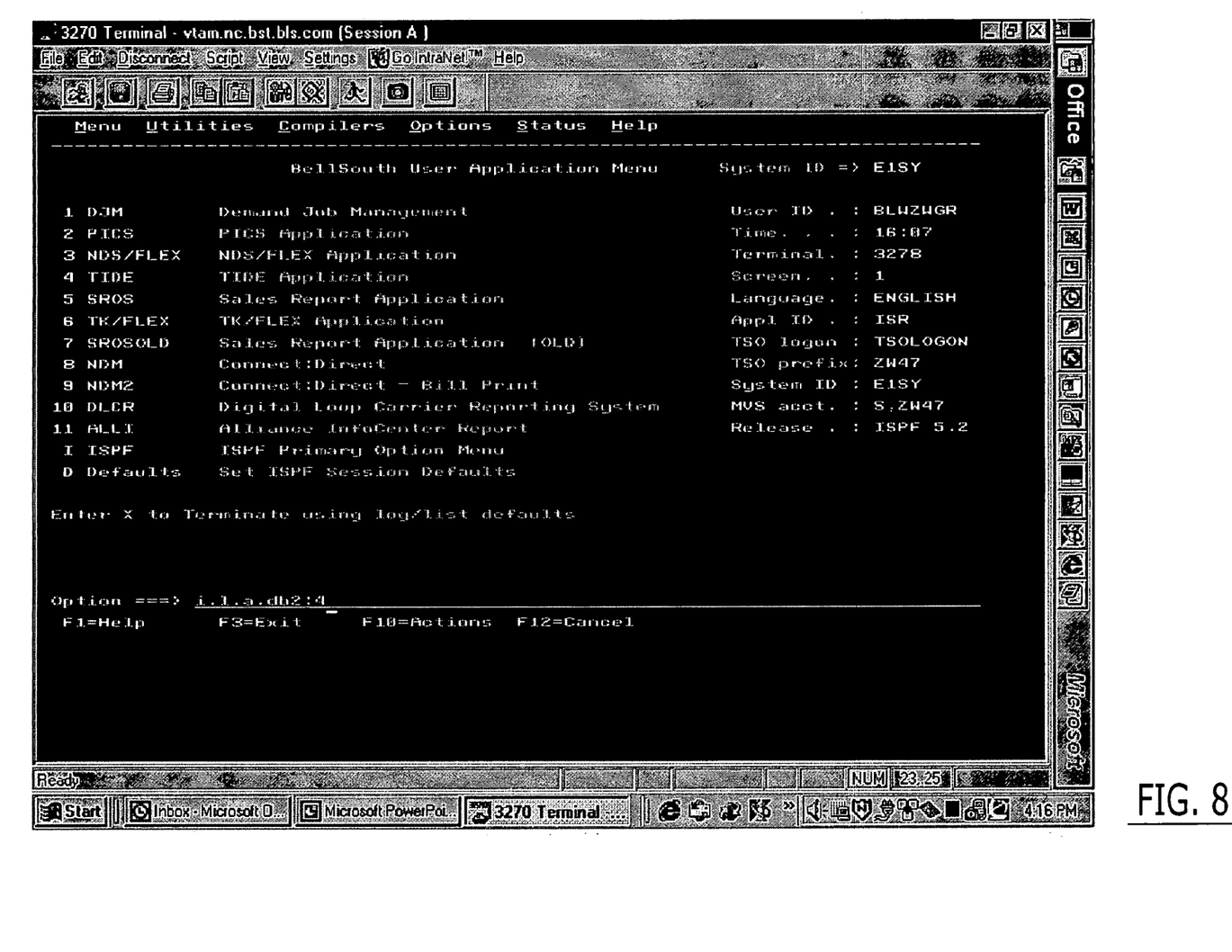

In particular, referring again to Block 420, the DB2 scripter 122 may be configured to automatically log on to the DB2 database, such as the DB2 database 112. As is well known to those having skill in the art, logging on to a DB2 database may be a complicated task. For example, as shown in FIG. 5, logging into a DB2 database 112 generally begins by connecting a 3270 session, and logging on to the application, for example by inputting "@XXX". The log-in may then continue as shown in FIG. 6, by providing a user ID and password, and then waiting at FIG. 7, until three asterisks "***" are returned by the DB2 database 112. After the asterisks are provided as shown in FIG. 7, the ENTER key is then pressed and three more asterisks eventually appear. ENTER may be pressed again and yet three more asterisks may appear, to thereby provide a first DB2 screen as shown in FIG. 8. According to embodiments of the present invention, the operations of FIGS. 5-8 are automatically performed by the DB2 scripter module 122 at Block 420, to automatically log on to the DB2 database 112.

Figure 9:
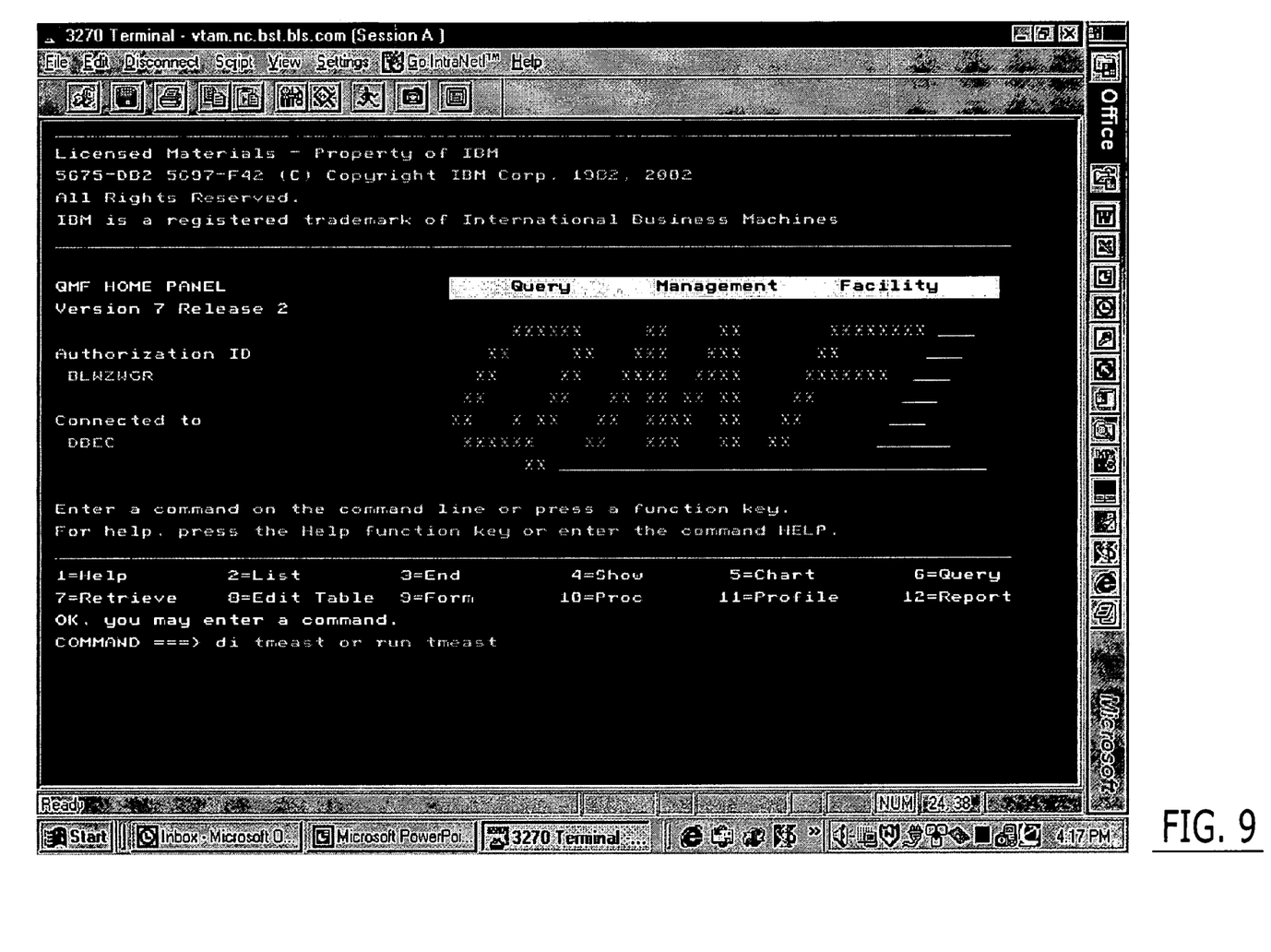

Returning again to FIG. 4, a query then may automatically be performed at Block 430, for example, by automatically entering "i.l.a.db2;4" on the screen of FIG. 8, to obtain the Query Management Facility (QMF) screen of FIG. 9. A command to display or run a query, such as "di tmeast" or "run tmeast", is then entered, as also shown in FIG. 9. If the query of FIG. 9 is run successfully, the display of FIG. 10 may appear.

Figure 10:
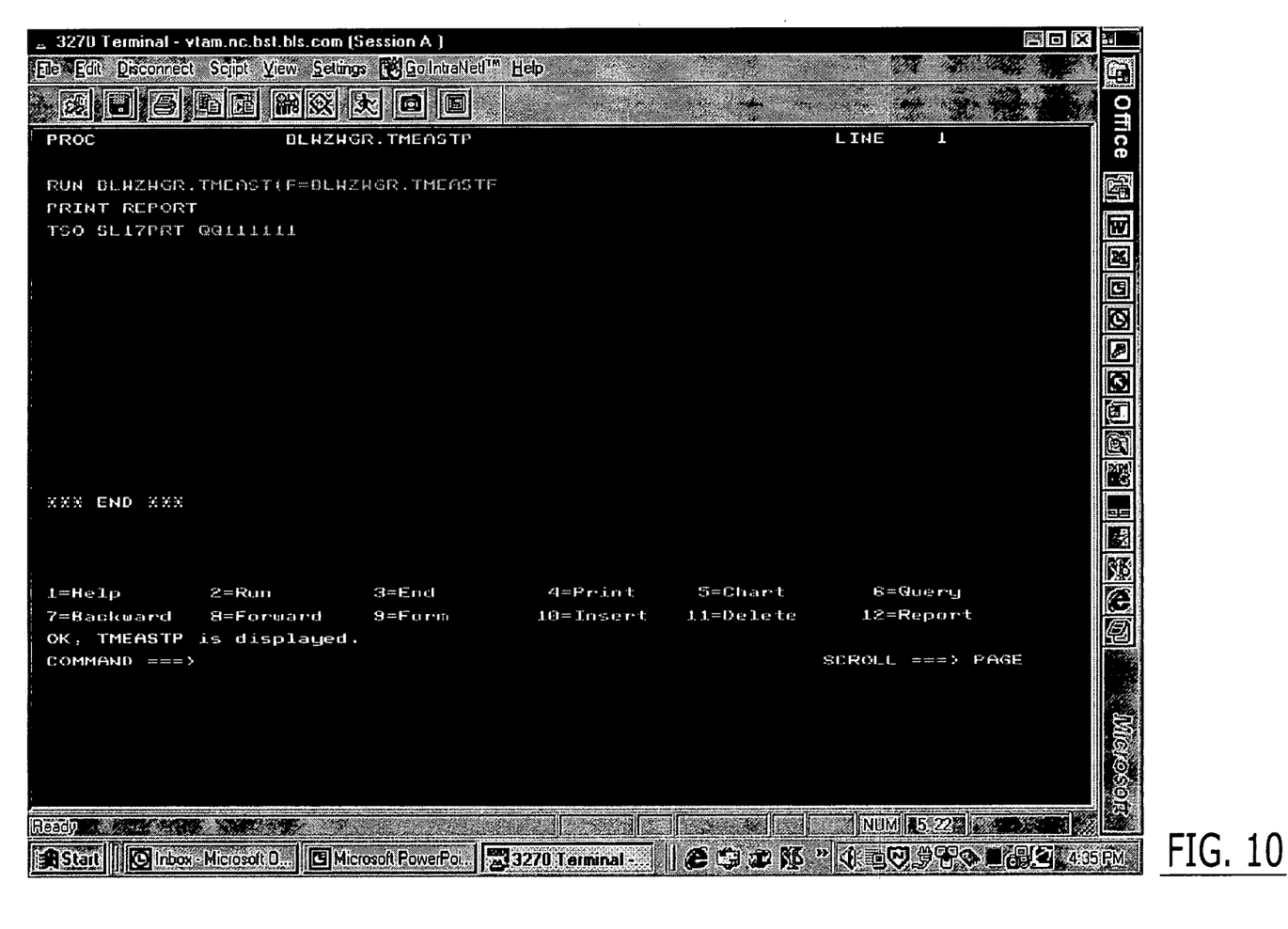

Referring again to FIG. 4, at Block 440, the DB2 scripter module 122 is also configured to automatically extract from the DB2 database 112 a dataset that results from the query. As shown in FIG. 10, the DB2 module scripter 122 is automatically configured to input a command to print the report to a virtual printer, such as the virtual printer 240 of FIG. 2. Virtual printers are well known to users of DB2 environments, and need not be described further herein. Optionally, at Block 450, the DB2 scripter 122 may be configured to log off the DB2 database 112, after the query results are extracted. In other embodiments, the DB2 scripter module 122 may be automatically logged off the DB2 database 112 after a predetermined period of inactivity.

Figure 11:
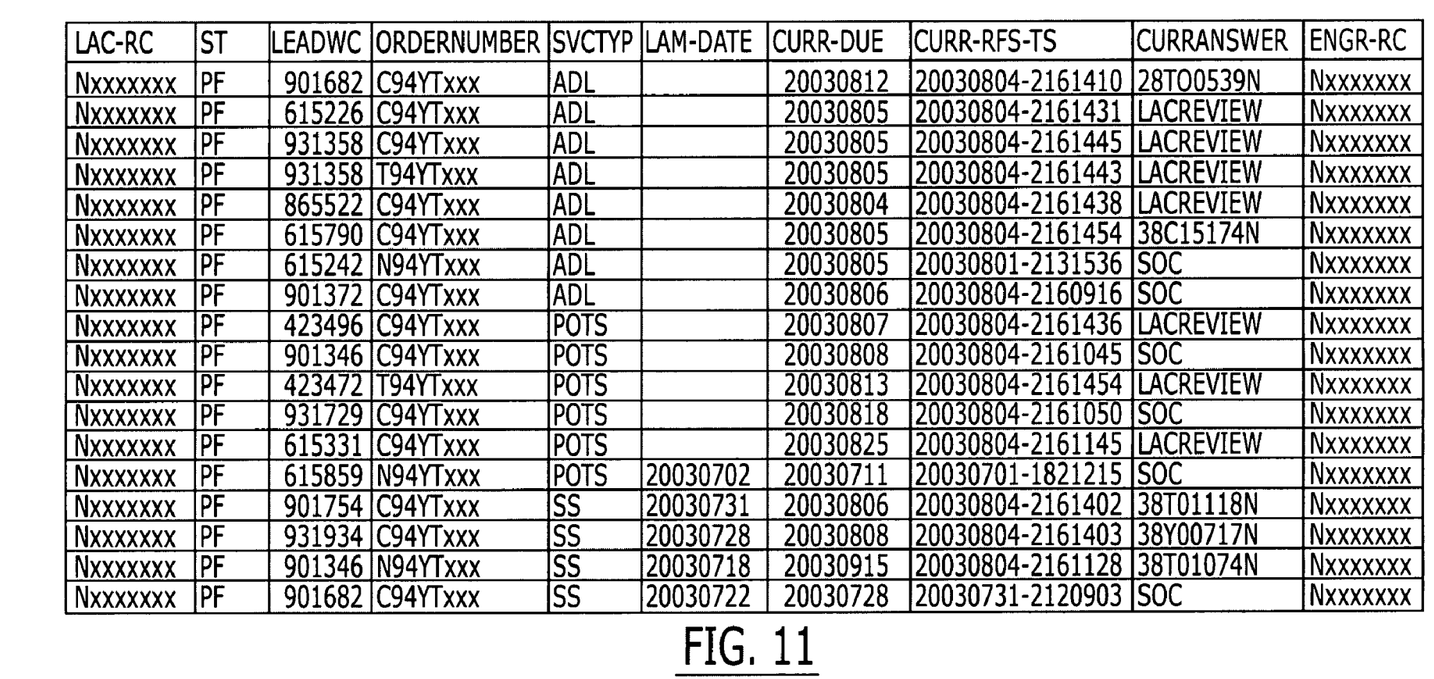

Returning again to FIG. 4, at Block 460, the dataset processor module 124 and/or UNIX scripter module 224 may be used to convert the dataset 140 to a text file 150. For example, FIG. 11 illustrates an example of a text file that is generated from a dataset that results from running a DB2 query. The dataset 140 may be sent to a virtual printer 240. From there, the UNIX scripter module 240 can pick up the dataset 140 and convert it to a text file 150, as shown in FIG. 11. Finally, referring again to FIG. 4, at Block 470, the text file 150 is provided to a user processor, such as the user processor 130 of FIG. 1, or the personal computer 230 of FIGS. 2 or 3. The text file 150 may then be imported into a Microsoft Excel file using macros that are provided with Microsoft Excel and/or using other techniques.

Figure 12:
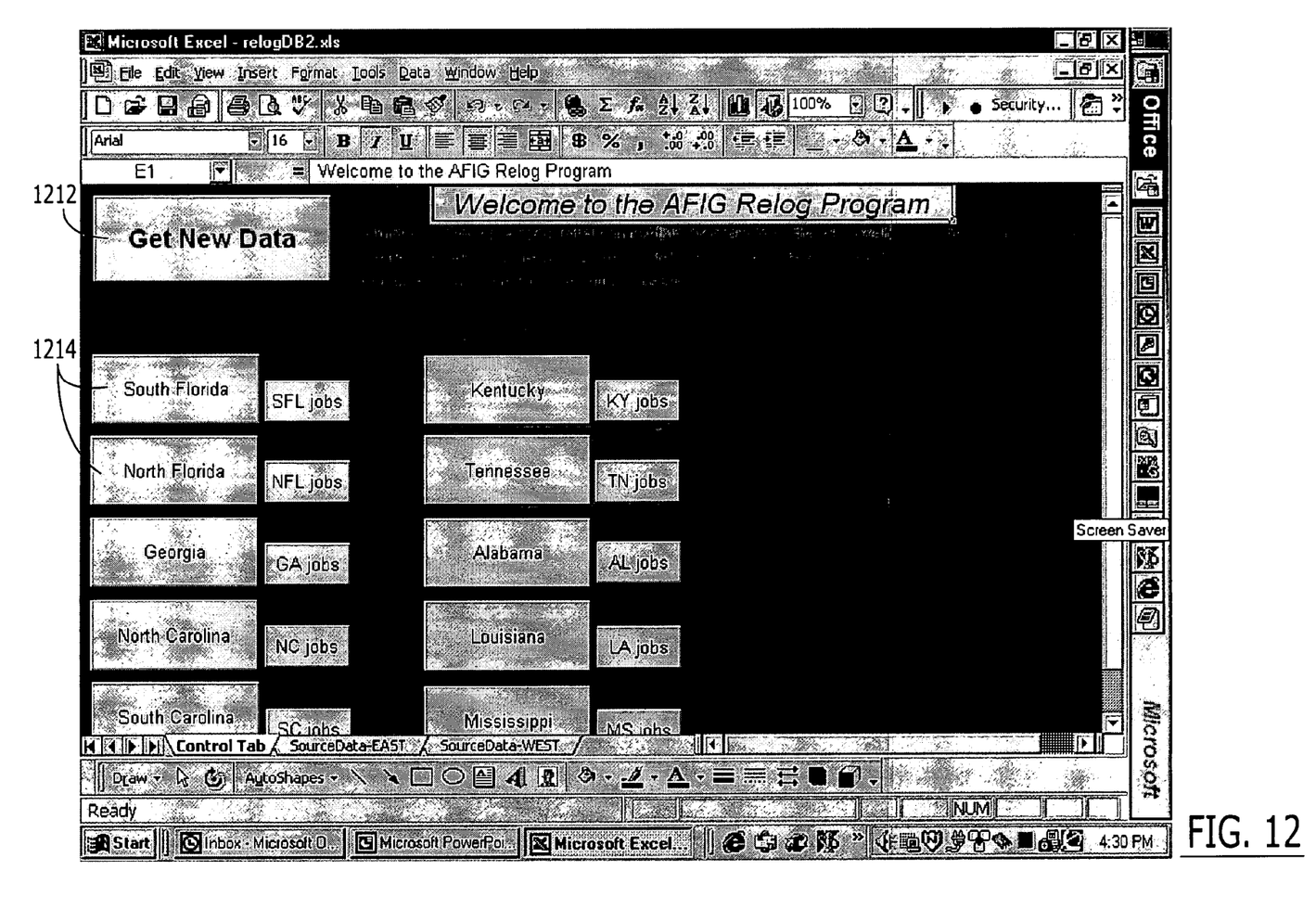

FIG. 12 is an example of a user interface that may be provided to an end user 132 of embodiments of the present invention. The user interface may be provided by the user processor 130 and/or PC 230 of FIGS. 1-3. This user interface allows a user to access data from a DB2 program that is referred to as AFIG Relog. As shown in FIG. 12, an end user may simply select the "Get New Data" button at any time, which causes the user processor 130 and/or PC 230 of FIGS. 1-3 to import the text file 150 and process the text file 150 to format the text file into a desired format for the end user 132. Thus, in some embodiments, the "Get New Data" button does not activate the DB2 scripter 122 and/or UNIX scripter 120 but, rather, may only retrieve the results of a query of the DB2 database 112 that was last made upon occurrence of a predetermined event. However, in other embodiments, the activation of the "Get New Data" button can provide the predetermined event 410 of FIG. 4, after which operations of Blocks 420-470 are automatically performed. In either case, from an end user perspective, all the end user need do is activate the button 1212 to obtain new data from the text file 150. Button 1214 allows the end user to view the text field data retrieved by button 1212 as specific states and/or types.

Thus, the end user who utilizes the Excel "Get New Data" button can retrieve the most recent "churn" produced by the dataset processor 124 and/or UNIX scripter 224 at the server 120, from the text file delivery site 150. The "Get New Data" button in Excel may not have any links to the dataset processor 124 and/or UNIX scripter 224 which may allow it to initiate the DB2 query. A programmer, server administration type or other user (administrative user), who need not be the end user, can be provided with links to the server 120, to initiate the operations of FIG. 4 as an administrative user, but not an end user who is an Excel macro delivery site recipient. This can be beneficial, in that the DB2 database may be queried once to allow several end users to use the same data as recipients from the delivery site. This can reduce or eliminate several recipients performing repetitive queries for the same data, as well as reducing excessive demands on the server and/or DB2 processor.

Figure 13:
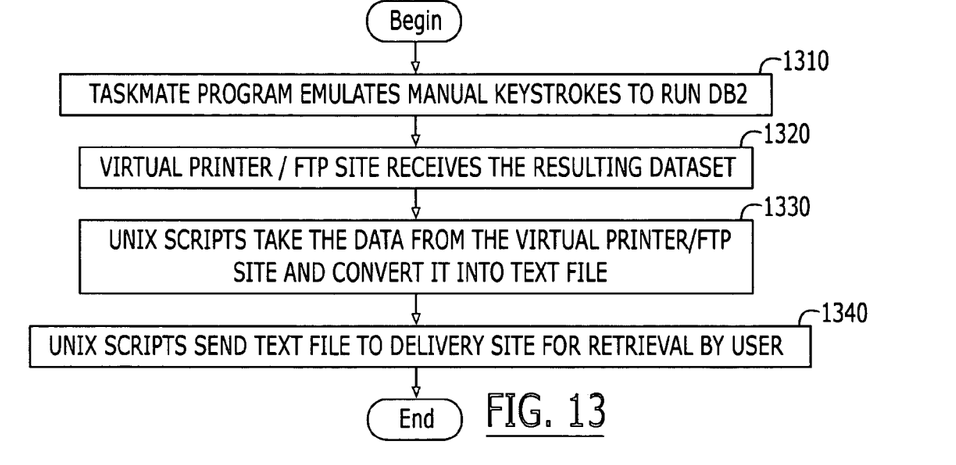
FIG. 13 is a flowchart of operations that may be performed to automatically retrieve data from a DB2 database according to other embodiments of the present invention.

FIG. 13 is a flowchart of operations that may be performed to automatically retrieve data from a DB2 database according to other embodiments of the present invention. As shown at Block 1310, a DB2 scripter module 122 may be created using a "Taskmate" program. As is well known to those having skill in the art, Taskmate is a software development environment that supports end user programming and allows users to customize host applications and mechanize host interactions through a high level workflow language. Taskmate is described, for example, in the *Taskmate Reference Manual, Version* 7.0, Wotech Software Systems, 1996-1997, and in U.S. Pat. No. 5,920,846. However, it will be understood that other DB2 scripter modules 122 may be used or designed according to embodiments of the present invention, to emulate manual keystrokes for DB2. In some embodiments, the Taskmate program may execute upon a predetermined event (Block 410), such as every 30 minutes, and/or upon a user request.

Referring now to Block 1320, the virtual printer 240 and/or FTP site 340 receives the resulting dataset. At Block 1330, UNIX scripts, such as provided UNIX scripter module 224, take the dataset from the virtual printer 240 and/or FTP site 340, and convert it into a text file 150. In some embodiments, if the dataset is contained in a virtual printer file 240, the conversion can take place by renaming the file as a .txt file. Then, at Block 1340, the UNIX scripts, such as provided by the UNIX scripter module 224, sends the text file to a delivery site for retrieval by a user. It will be understood that the delivery site may be an unpublished Web directory, a shared folder on a PC and/or any other user accessible site.

Figure 14:
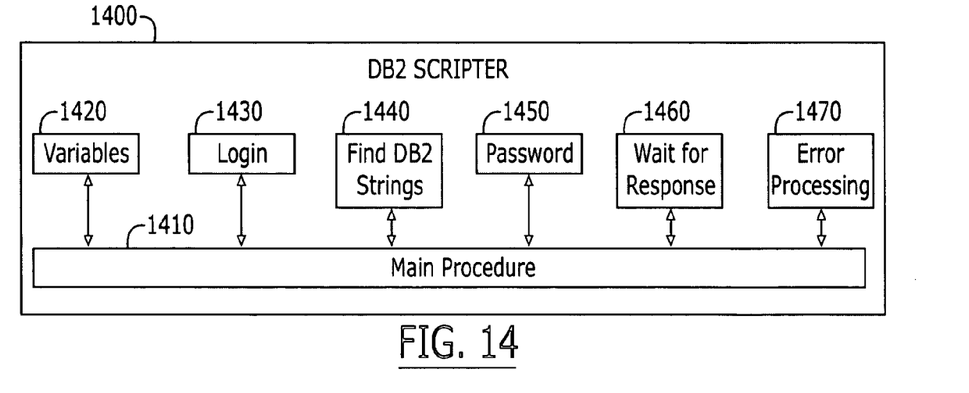
FIG. 14 is a block diagram of a DB2 scripter module that may be provided according to various embodiments of the present invention.

FIG. 14 is a block diagram of a DB2 scripter module, which may correspond to DB2 scripter module 122 of FIGS. 1-3, according to some embodiments of the present invention, and which may perform the operations of Block 1310. As shown in FIG. 14, in some embodiments, a DB2 scripter module 1400 can include a procedure 1420 that declares and initializes variables, a procedure 1430 to perform the DB2 log-on, a procedure 1440 to find various strings that are returned by DB2, a procedure 1450 to decrypt DB2 passwords, a procedure 1460 to allow the DB2 scripter module to wait for a response from DB2, and an error processing procedure 1470. A main procedure 1410 can interact with all of the procedures 1420-1470, to log on to DB2, run the query, export the results to a virtual printer or FTP site, and log out of DB2.

Figure 15:
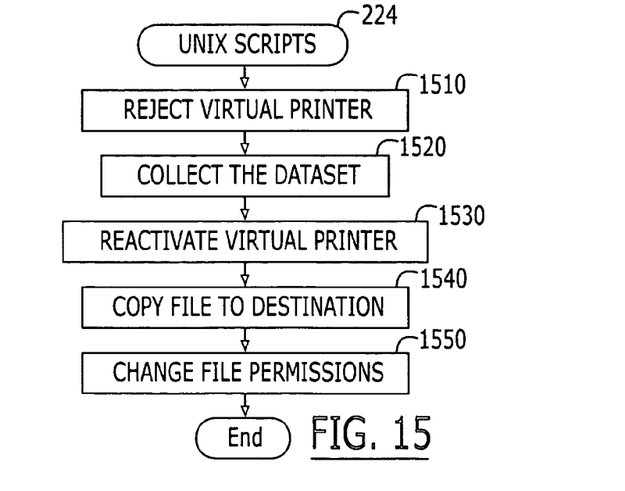
FIG. 15 is a flowchart of operations that may be performed by a UNIX scripter module according to various embodiments of the present invention.

FIG. 15 is a flowchart of operations that may be performed by a UNIX scripter module, such as the UNIX scripter module 224, operating in conjunction with a virtual printer 240, which may perform operations of Blocks 1330 and 1340, according to various embodiments of the present invention. As shown in FIG. 15, at Block 1510, the virtual printer is "rejected" to thereby prevent additional files from being loaded into the virtual printer. At Block 1520, the dataset is collected from the virtual printer. At Block 1530, the virtual printer is reactivated to allow new files to be exported thereto. At Block 1540, the files are copied to a destination, such as an unpublished website. Finally, at Block 1550, the file permissions are changed to make the file read-only.

Accordingly, embodiments of the present invention can allow automatic retrieval of data from a DB2 database. Conventionally, data is extracted from DB2 using multiple manual steps to access and run a query, and then to export the data into Excel or another user program. For example, the following steps conventionally may be performed manually:

1. Connect to a 3270 session.
2. Log into the application with e.g. @XXX.
3. Provide user id and password and wait for 3 asterisks.
4. Hit ENTER after 3 asterisks appear and wait for 3 more asterisks.
5. Hit ENTER again when 3 more asterisks appear to reach first screen.
6. Move through the next series of screens with e.g. 'I.L.A.DB2;4'.
7. Finally reach the query screen then enter 'DI or RUN query' to display or run.
8. When result set appears type 'export report to xxxxxxxx'.
9. Log out of system using 5 separate commands.
10. FTP file to user's hard drive.
11. Open an Excel workbook and activate the import wizard.
12. Move through the conventional five steps of the wizard to view the data.
13. Save file as is or utilize a variety of other sorts and filters in Excel.

In contrast, embodiments of the present invention can automatically retrieve data from a DB2 database upon occurrence of a predetermined event.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A system for automating retrieval of data from a DataBase 2 (DB2) database comprising:
    a memory and a processor;
    a DB2 scripter module that is configured to automatically log on to the DB2 database, to automatically perform a query of the DB2 database and to automatically extract from the DB2 database a dataset that results from the query; and
    a dataset processor module that is configured to convert the dataset that is extracted from the DB2 database into a text file and to deliver the text file to a delivery site for retrieval by a user,
    wherein the DB2 scripter module is configured to automatically extract from the DB2 database a dataset that results from the query by printing the dataset to a DB2 virtual printer or by exporting the dataset to a File Transfer Protocol (FTP) site.

2. A system according to claim 1 wherein the DB2 scripter module is activated upon occurrence of a predetermined event.

3. A system according to claim 2 wherein the predetermined event comprises a predetermined time and/or activation by a user.

4. A system according to claim 1 further comprising a user processor module that is configured to convert the text file into a format that is viewable by the user.

5. A system according to claim 4 wherein the user processor module comprises a personal computer spreadsheet macro.

6. A system according to claim 1 wherein the dataset processor module comprises a UNIX scripter module.

7. A system according to claim 1 wherein the DB2 scripter module is further configured to automatically log off the DB2 database after automatically extracting the dataset that results from the query.

8. A method for automatically retrieving data from a DB2 database comprising the following that are automatically performed in sequence in response to occurrence of a predetermined event:
    executing a DB2 script that is configured to log on to the DB2 database, to perform a query of the DB2 database and to extract from the DB2 database a dataset that results from the query;
    converting the dataset that is extracted from the DB2 database into a text file; and
    delivering the text file to a delivery site for retrieval by a user,
    wherein the DB2 script is configured to extract from the DB2 database a dataset that results from the query by printing the dataset to a DB2 virtual printer or by exporting the dataset to a File Transfer Protocol (FTP) site.

9. A method according to claim 8 wherein the predetermined event comprises a predetermined time and/or activation by a user.

10. A method according to claim 8 further comprising converting the text file into a format that is viewable by the user.

11. A method according to claim 10 wherein the converting is performed by a personal computer spreadsheet macro.

12. A method according to claim 8 wherein the DB2 script is further configured to automatically log off the DB2 database after automatically extracting the dataset that results from the query.

13. A computer program product that is configured to automate retrieval of data from a DataBase 2 (DB2) database, the computer program product comprising a computer usable storage medium having computer-readable program code embodied in the medium, the computer-readable program code comprising:

computer-readable program code that is configured to automatically log on to the DB2 database, to automatically perform a query of the DB2 database and to automatically extract from the DB2 database a dataset that results from the query; and computer-readable program code that is configured to convert the dataset that is extracted from the DB2 database into a text file and to deliver the text file to a delivery site for retrieval by a user, wherein the computer-readable program code that is configured to automatically log on to the DB2 database is configured to automatically extract from the DB2 database a dataset that results from the query by printing the dataset to a DB2 virtual printer or by exporting the dataset to a File Transfer Protocol (FTP) site.

14. A computer program product according to claim 13 wherein the computer-readable program code that is configured to automatically log on to the DB2 database is responsive to occurrence of a predetermined event.

15. A computer program product according to claim 14 wherein the predetermined event comprises a predetermined time and/or activation by a user.

16. A computer program product according to claim 14 further comprising computer-readable program code that is configured to convert the text file into a format that is viewable by the user.

17. A computer program product according to claim 14 wherein the computer-readable program code that is configured to automatically log on to the DB2 database is further configured to automatically log off the DB2 database after automatically extracting the dataset that results from the query.

* * * * *